United States Patent [19]

Kurimoto et al.

[11] Patent Number: 5,038,168
[45] Date of Patent: Aug. 6, 1991

[54] PHOTOGRAPHIC PRINTING APPARATUS

[75] Inventors: Tetsuya Kurimoto; Yasuo Ohkoshi; Nobu Nakane; Yutaka Ohsone, all of Hino, Japan

[73] Assignee: Konica Corporation, Tokyo, Japan

[21] Appl. No.: 566,986

[22] Filed: Aug. 13, 1990

[30] Foreign Application Priority Data

Aug. 19, 1989 [JP] Japan .................................. 1-213943

[51] Int. Cl.$^5$ ............................................ G03B 27/52
[52] U.S. Cl. ....................................... 355/56; 355/57; 355/68; 355/71
[58] Field of Search ................. 355/55, 56, 57, 68, 355/71

[56] References Cited

U.S. PATENT DOCUMENTS 4,643,562  2/1987  Kaneko et al. ......................... 355/56
4,808,988  2/1989  Verner ................................... 355/55

*Primary Examiner*—Monroe H. Hayes
*Attorney, Agent, or Firm*—Frishauf, Holtz, Goodman & Woodward

[57] ABSTRACT

The invention provides an apparatus for printing an image of a negative film on a photographic print paper. The apparatus is equipped with a zoom lens for changing a printing magnification rate and the zoom lens incorporates an adjustable diaphragm for changing an aperture size. A standard F-number for each of possible magnification rates is predetermined in view of actual printing result, and a resultant F-number is stored in a memory for each of possible magnification rates. In the apparatus provided a sensor, disposed on the optical axis of the zoom lens, for detecting the illuminance of a projected surface on the photographic print paper and CPU for controlling the adjustable diaphragm in response to the detected illuminance to determine an optimum aperture size to obtain the predetermined F-number for each of possible magnification rates. The optimum aperture size is stored in the memory for each of possible magnification rates.

5 Claims, 3 Drawing Sheets

PHOTOGRAPHIC PRINTING APPARATUS

BACKGROUND OF THE INVENTION

The present invention relates to improvements in an exposure condition determining means of a photographic printing apparatus in which printing of variable magnification rate is conducted by zooming so that a print can be obtained from a negative.

Referring to FIG. 5 in which the side view of the composition of a photographic printing apparatus is illustrated, the prior art will be explained. An image of the negative film 1 located on a predetermined position on the negative mask 1a, is irradiated with diffused light having a predetermined luminance, wherein the diffused light is coming from the light source 9 through the heat absorbing filter 8, the B G R [Blue.Green.Red] cut sheet filter 7 for color separation, and the mirror box 15. The image of the above-described negative film 1 is projected by the zoom lens 3 and the projected image is focused on the emulsion coated surface of the photographic paper 6 via the reflecting mirror 5. In order to make a projected image of a predetermined magnification rate from the above-described negative film 1, the lens element of the above-described zoom lens 3 is moved in the direction of the optical axis so that the focal length can be changed. When the above-described photographic paper 6 is exposed, the appropriate exposure is determined by the most appropriate combination of the aperture size of the diaphragm 2 in the above-described zoom lens and the opening time period of the shutter 4 located at a predetermined position on the optical path. When an image is magnified to a size different from the standard size by zooming or an image is magnified to an optional size and the magnified image is trimmed by a variable mask provided to the negative film 1, the exposure is determined in such a manner that: the opening time period of the above-described shutter 4 is changed according to the magnification rate and the diaphragm 2 is manually adjusted in order to select the appropriate diaphragm aperture size so that the exposure amount can be set to the appropriate value which is the same as the exposure to the standard print size. The measurement of image illuminance at the position close to the focussing surface and the trial printing are conducted in order to determine the appropriate diaphragm aperture. Then the exposure conditions are also determined.

Generally speaking, when projected images of a plurality of magnification rates are made from the full size of negative film 1 or the trimmed negative image, the focal length of the above-described zoo lens 3 is changed. As the aperture diameter D of a lens is constant, according to the equation of $F_{NO}=f/D$, F-number (F-number will be called F hereafter in this specification.) which indicates the brightness of a lens, is varied with the change of the focal length. For that reason, the exposure of the projected image must be changed when the images of various magnification rates are made from the negative film 1 having a constant luminance through the above-described zoom lens 3. For example, assuming that: the shutter opening time period is constant; the above-described zoom lens 3 is used; the negative film 1 of 35 mm size is applied to the printer; and the diaphragm aperture size with which the projected image of the economical print size E is exposed on the above-described printing paper 6 is the standard value to get the most appropriate exposure amount. When the print of 8×10 inch size or 10×12 inch size is made, the focal length of the above-described zoom lens must be changed. Accordingly, $F_{NO}$ of the zoom lens 3 is necessarily changed. Therefore, the diaphragm aperture size must be changed so that the standard exposure amount to the above-described E print size can be given to the print. When the negative size is the half size, which is a half of 35 mm size, is printed to E size ,the diaphragm aperture size must be changed in the same way as described above so that the exposure amount which is the same as the standard exposure can be given to the print. The conventional method to change the magnification rate is as follows: the diaphragm aperture size is changed manually or the shutter opening time period is changed while trial printing is conducted; and it is judged whether the exposure amount is the same as the most appropriate image exposure amount or not. This method is not efficient in the case of a high speed photographic printing apparatus in which not less than 30 sheets per minute of prints can be processed, wherein the apparatus must be stopped in order to set up each time the magnification rate is changed.

Exposure amount is determined by a worker according to his experience, so that the exposure amount varies from print to print when the magnification is changed, which deteriorates the quality of prints.

SUMMARY OF THE INVENTION

The object of the present invention is to provide a photographic printing apparatus in which the correct image exposure amount can be selected in a short period of time even if prints of various sizes are printed.

This object can be accomplished by each of the following means, (a), (b), and (c).

(a) A photographic printing apparatus which is characterized in that: a zoom lens with the function of diaphragm aperture size adjustment is provided to the apparatus; an illuminance detecting sensor is provided on the optical axis of exposure; the diaphragm aperture size is determined while the illuminance of the projected image of the negative is detected, so that the aperture size can be set to the most appropriate value; and the most appropriate diaphragm aperture size corresponding to each zoom magnification rate is stored in a memory.

(b) A photographic printing apparatus according to the above-described item (a), which comprises: a means by which the stored diaphragm aperture size data corresponding to a designated print size which needs to be printed is set; and a means by which the exposure amount for a print size is automatically determined from the optimum F-number.

(c) A photographic printing apparatus according to the above-described item (a) or (b), which is characterized in that: an aperture adjusting mechanism is provided to the negative holding mask so that the trimming of the negative image can be adjusted.

PREFERRED EMBODIMENT OF THE INVENTION

Figure 1:
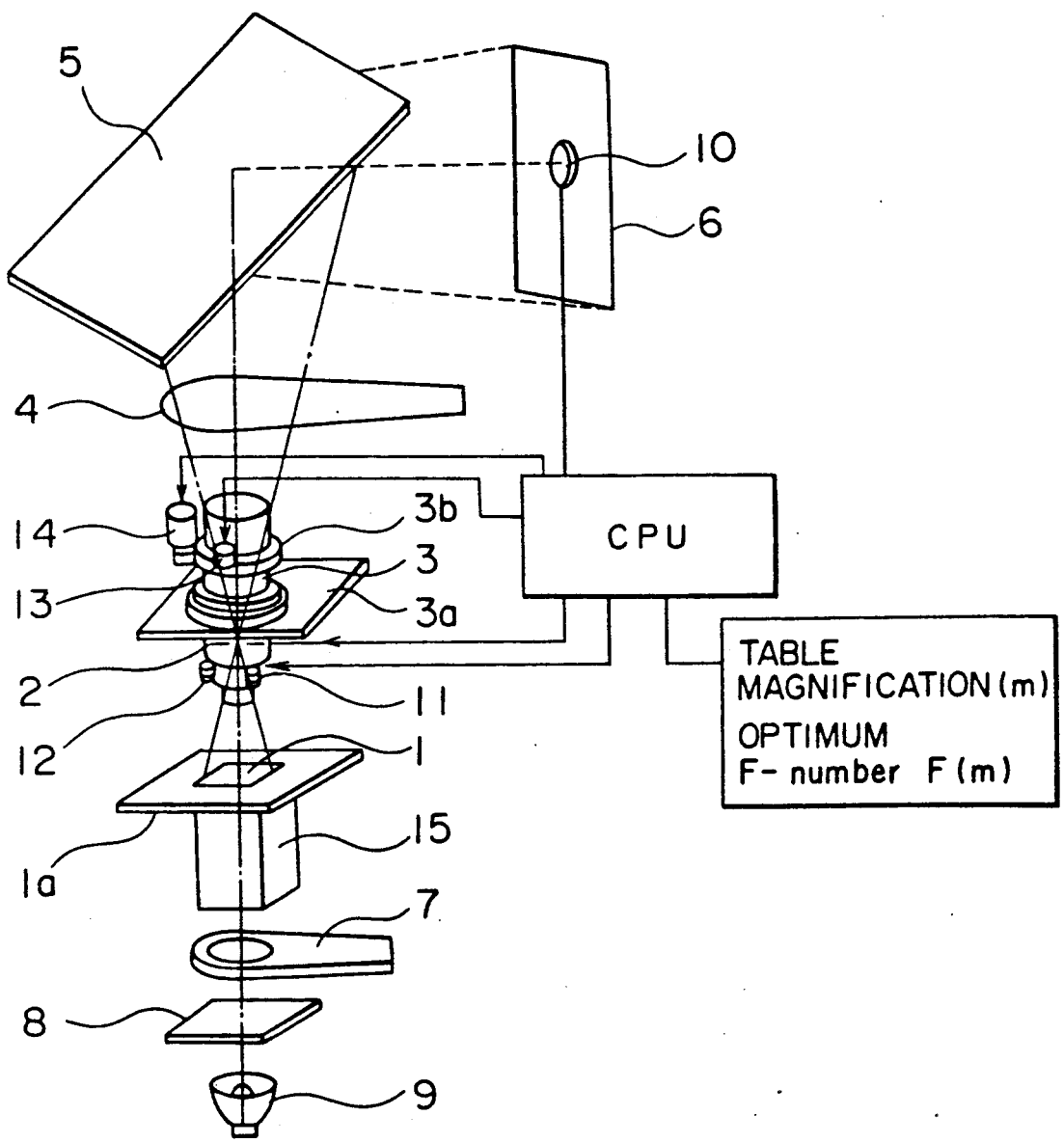
FIG. 1 is a perspective view which shows the composition of an example of the photographic printing apparatus of the present invention.
Figure 2:
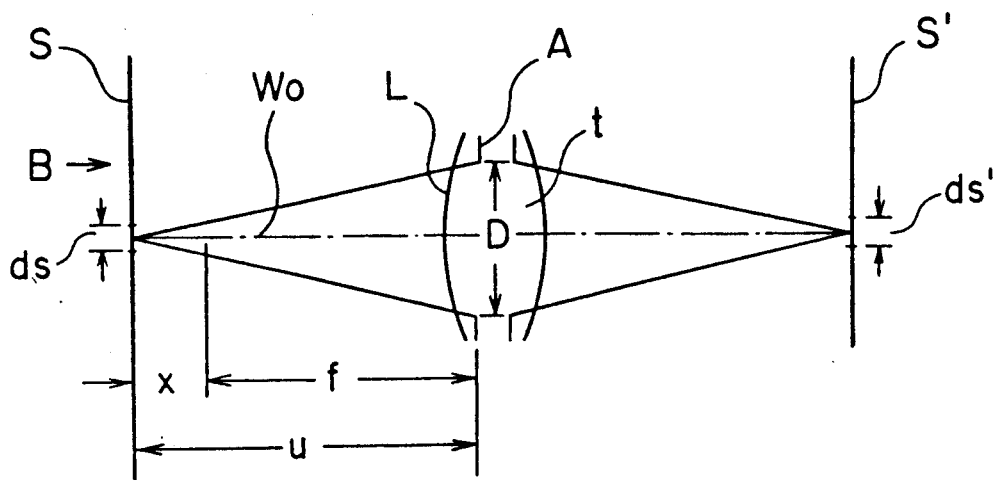
FIG. 2 is a schematic illustration which shows the illuminance relation between a lens, a negative, and an image on photographic paper.

Referring now to FIG. 1 which is a perspective view of a photographic printing apparatus and to FIG. 2 which shows the illuminance relation between lens L, negative S, and the image on photographic paper S', an example of the present invention will be explained, wherein the part having the same function's designated in same numeral throughout all views. However, it should be understood that the invention is not limited to the specific embodiment. The reverse side of the negative film 1 located at a predetermined position on the mask 1a which is provided to a photographic printing apparatus, is illuminated with uniform diffused light emitted by the light source 9 which has predetermined luminance, through the heat absorbing filter 8, the B G R cut sheet filter 7, and the mirror box 15.

The zoom lens 3 is provided to the lens frame 3a which is located at a predetermined position in the optical path facing the negative film 1. The projected image of the above-described negative film 1 which was formed by the zoom lens 3, is reflected at a right angle by the surface of the reflecting mirror 5 which is fixed to a frame not illustrated in the drawing, and the image is focussed on the photographic paper 6 located at a predetermined image formation position. Since the photographic printing apparatus is provided with the above-described zoom lens 3, the image can be magnified from the same negative film to various print sizes, and the image also can be magnified from a different sized negative film to an optional print size. When the magnification rate of the image is changed by the above-described zoom lens 3, the lens element in the zoom lens 3 is shifted so that the focal length can be changed and the print of a predetermined magnification rate can be obtained. The magnification motion is conducted by the above-described zoom lens 3 in such a manner that: the focal length is computed according to each print size to which the negative film is magnified; the computed focal length is stored in a memory; and the motor 14 for use in zooming which is provided to the lens barrel 3b, is driven under the control of CPU so that the lens element in the above-described zoom lens 3 can be shifted in the direction of the optical axis.

When the above-described zoom lens 3 is set to the focal length corresponding to a predetermined magnification rate, the above-described zooming motor 14 is stopped being controlled by the above-described CPU to which the detected information is inputted from the position detecting sensor 13 so that the new focal length f and the magnification rate can be set. The focal length f of the zoom lens 3 is changed in this way. As the lens aperture D of the zoom lens 3 is constant, the brightness index $F_{NO}$ is necessarily changed according to the equation of $F_{NO}=f/D$, so that the image illuminance on the above-described photographic paper 6 is also changed. Generally speaking, relating to the image illuminance, the following equation is satisfied according to the drawing of FIG. 2 which shows the luminance relation between a lens, a negative, and a focussed image on the photographic paper. Namely, ds is defined as a minute area on a negative film on an optical axis which forms a completely diffusive plane. Wherein the luminance of the negative image is B cd/m² [caudela/m²], and ds' is defined as a minute area of the image S' on the photographic paper, wherein the image is formed by the lens L, and further $w_0$ is defined as the solid angle of the luminous flux $\Phi$ which is stretched over the aperture D of the entrance pupil A. $\Phi$ is given by $$\Phi = Bdsw_0 = \frac{Bds\pi}{u^2}\left(\frac{D}{2}\right)^2 \quad (1)$$

In the above equation, u is defined as the distance between the surface of the entrance pupil A and the negative S, and D is defined as the diameter of the entrance pupil. When the magnification rate of the lens L is represented by m, $$ds' = m^2 ds \ldots (2).$$

When the transmittance of the lens L is represented by t, the luminous flux $t\Phi$ is concentrated on ds', and the illuminance $E_0$ on the projected image surface can be represented by $$E_0 = \frac{t\Phi_0}{ds'} = \frac{t\pi B}{u^2 m^2}\left(\frac{D}{2}\right)^2 \quad (3)$$

The symbol f is defined as the focal length of the lens, and x is defined as the distance from the front focus of the lens to the negative S. According to the general equation of lens, the following equations are satisfied.

$$u = f + x, \quad m = f/x$$

Consequently, $E_0$ can be given by $$E_0 = \frac{\pi t B \left(\frac{D}{2}\right)^2}{(m+1)^2 f^2} (LUX) \quad (4)$$

The equation (4) gives the illuminance $E_0$ of the projected image surface on the optical axis, wherein the magnification rate is contained in the equation. The exposure amount E of the projected image is given from the F number and the magnification rate m by $$E \propto \frac{1}{F^2(m+1)^2} \quad (5)$$

And assuming that $E_1$ is defined as the projected image exposure amount when a magnification rate is $m_1$ and a F-number is $F_1$, the projected image exposure amount $E_2$, when the magnification rate is $m_2$ and a F-number is $F_2$, is given by introducing from the equation (5) as follows:

$$E_2 = \frac{F_1^2(m_1+1)^2}{F_2^2(m_2+1)^2} E_1 \quad (6)$$

Therefore, we can say that: since F-number is changed when the focal length of the above-described zoom lens 3 is changed, the surface of the above-described photographic paper 6 must be always given a predetermined amount of exposure by changing the opening time period of a shutter and the diaphragm aperture size at each time when the magnification rate different from the standard value is set, for instance. The method of the present invention is different from the conventional one in which the diaphragm aperture size and the shutter opening time period are manually changed. In the method of the invention, when determining an appropriate aperture size for each of possible magnification rates, the illuminance detecting sensor 10 is inserted on the optical axis on the image focussed surface, and the illuminance information received by the above-described illuminance detecting sensor 10 is sent to the above-described CPU at the same time as when the focal length of the above-described zoom lens 3 is changed.

Figure 3:
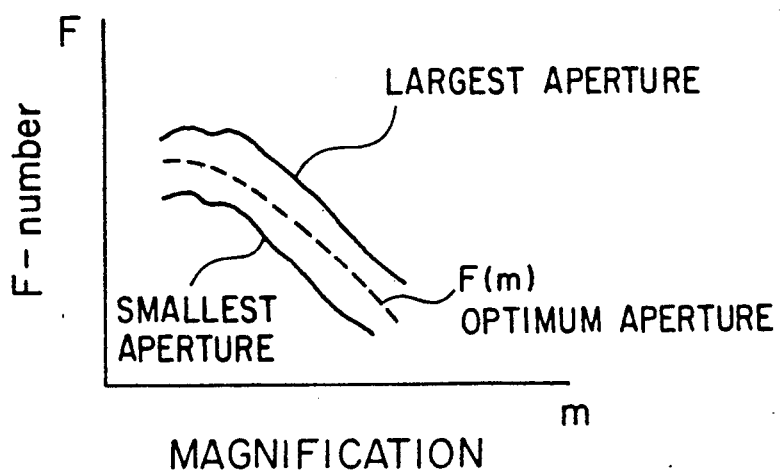
FIG. 3 is a graph which shows the relation between the magnification rate and F-number.
Figure 4A:
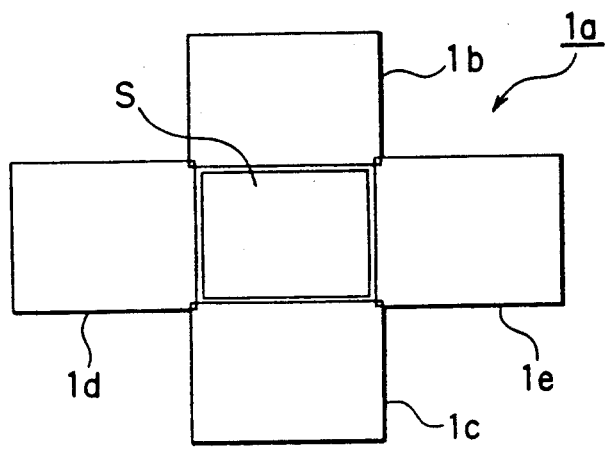
FIG. 4(a) and FIG. 4(b) are plan views of a negative holding mask which has the function of trimming.
Figure 4B:
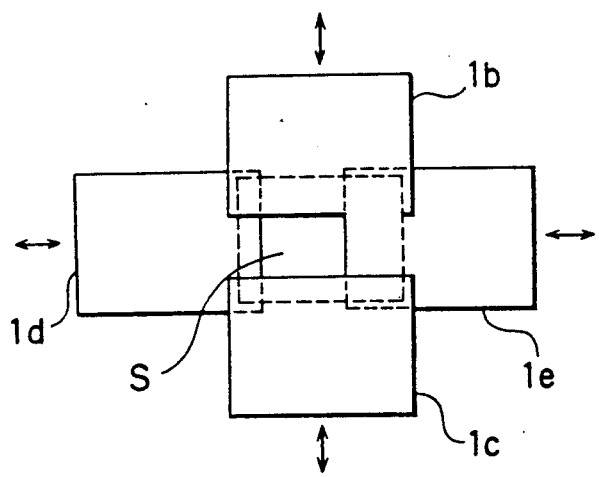
Figure 5:
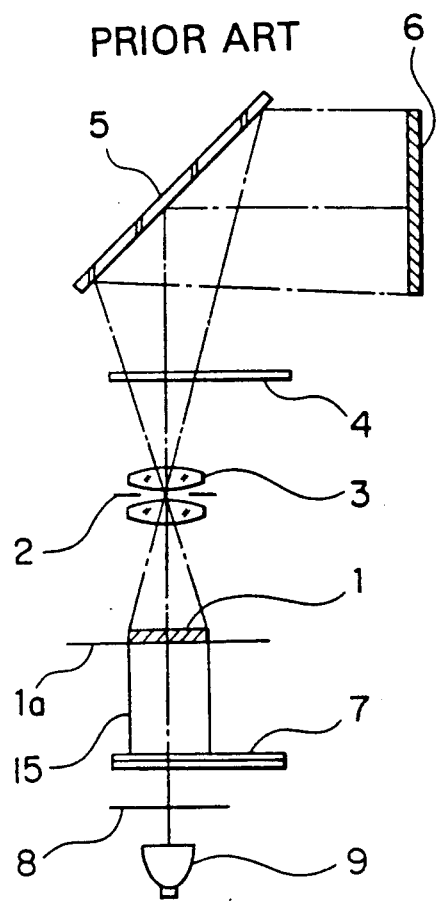
FIG. 5 is a side view which shows the composition of a conventional photographic printing apparatus.

The relation between the magnification rate m and F-number F as shown in FIG. 3 is predetermined and stored in a memory. Concerning F-number, the following measure are taken: for the improvement of the quality of a print, F-number F is to be increased and then the exposure time is made long; or on the contrary, for the increment of the productivity, the exposure time is to be made short and then F-number is reduced accordingly. However, the most suitable F-number F (m) with regard to the magnification rate m is shown by a dotted line in FIG. 3 which was made according to the results of the experiment conducted by the applicant, wherein m is defined as the magnification rate and F is appropriate F-number in order to increase the quality of a print and to improve the productivity.

The above-described CPU activates the diaphragm 2 to obtain the exposure amount $E_2$ computed by the following way. The most appropriate F-number F(m) at an optional magnification rate $m_2$ is expressed in terms of $m_2$ in such a way as $F(m_2)$, and the exposure amount $E_2$ with regard to the exposure amount $E_1$, is given by using predetermined F-number F(m) in a following equation:

$$E_2 = \frac{\{F(m_1)\}^2 \cdot (m_1 + 1)^2}{\{F(m_2)\}^2 \cdot (m_2 + 1)^2} E_1 \qquad (7)$$

where $E_1$ is the exposure amount on the image focussed surface in the case of the standard magnification $m_1$.

The most appropriate aperture size and the magnification rate $m_2$ are stored in memory, wherein the aperture size and the magnification rate $m_2$ is obtained according to the output of the diaphragm sensor so that the exposure amount E can become so close to the exposure amount $E_2$ obtained by the equation (7). As described above, the magnification rate and aperture size are combined in such a way that the exposure amount on the focussed surface can be in a constant relation even when the magnification rate $m_2$ is changed to an optional magnification rate. The above-described CPU controls the motor 12 which is provided to the above-described lens barrel 3b according to the combined data of the magnification rate and the aperture size stored in memory and moves the diaphragm 2. When the diaphragm 2 is moved to a predetermined aperture size, the diaphragm aperture size is fed back to the above-described CPU, wherein the diaphragm aperture size is detected by the diaphragm aperture size detecting sensor 11 provided to the above-described lens barrel 3b so that the above-described motor 12 which moves the diaphragm can be stopped by the control of CPU and the diaphragm can be set at a predetermined aperture size.

The shutter opening time period $T_2$ at the magnification rate $m_2$, can be given from the shutter opening time $T_1$ at the magnification rate $m_1$ by the following equations (8), (9), and (10).

$$T_2 = 2^{Klog \frac{E_2}{E_1}} \cdot T_1 \qquad (8)$$

$$T_2 = \left(2^{Klog \frac{F_1^2(m_1 + 1)^2}{F_2^2(m_2 + 1)^2}}\right) T_1 \qquad (9)$$

$$T_2 = \left(2^{Klog \frac{\{F(m_1)\}^2 \cdot (m_1 + 1)^2}{\{F(m_2)\}^2 \cdot (m_2 + 1)^2}}\right) T_1 \qquad (10)$$

where K is a proportional constant relating to the exposure amount on the focussed surface and the print density.

When the shutter opening time $T_1$ at the magnification rate $m_1$ is adjusted beforehand, the shutter opening time $T_2$ at the magnification rate $m_2$ can be obtained because F-number $F(m_1)$ and $F(m_2)$ are stored beforehand. Accordingly, whatever print size may be used other than the standard print size, the appropriate exposure amount by the appropriate shutter opening time period and the appropriate diaphragm aperture size can be always given to the photographic paper 6 just as in the standard print condition. The above-described illuminance detecting sensor 10 is not necessarily provided at the position close to the image focussing surface, and it may be provided to a position on an optical axis. The exposure amount to the focussing surface can be changed anyway according to the combination of F-number of a lens and the opening time of a shutter, and further the exposure amount can be made the same value in spite of the reforming of the combination. Accordingly, it is possible to keep F-number constant and to change the shutter opening time according to the change of the focal length of the above-described zoom lens 3.

These exposure conditions are in the scope of this invention too.

Furthermore, considering the trimming exposure, the above-described negative holding mask 1a is provided with the upper and lower movable mask plates 1b,1c and the right and left movable mask plates 1d,1e, and even when the negative size and the trimming position are changed, it is manifest that the arbitrary magnification rate $m_2$ and F-number $F(m_2)$ can be set at the most appropriate values from the view point of quality and production efficiency so that the most appropriate exposure amount can be determined just as in the standard condition.

Since the photographic printing apparatus of the present invention is composed in such a way as described above, it has following advantages: the most appropriate exposure amount to the photographic paper can be always and automatically selected and the shutter opening time can be computed even when the print of any size is made from the above-described negative or the trimmed negative; and accordingly even when variable magnification rate is conducted, prints of a uniform image tone with a good reproduceability can be made, so that the print quality is remarkably improved. In a conventional photographic printing apparatus, the diaphragm aperture size has to be manually adjusted in changing the magnification rate and a trial printing has to be conducted, so that a long time is consumed to set up the printer. However, in the case of the printing apparatus of the present invention, those procedures described above can be eliminated so that the operation rate of the photographic printing apparatus can be greatly increased.

What is claimed is:

1. An apparatus for printing an image of a negative film on a photographic print paper, comprising:
    a zoom lens for changing a printing magnification rate, the zoom lens including an adjustable diaphragm for changing an aperture size;
    a sensor, disposed on the optical axis of the zoom lens. for detecting the illuminance of a projected surface on the photographic print paper;
    a memory for storing a predetermined F-number for each of possible magnification rates; and
    control means for controlling the adjustable diaphragm in response to the detected illuminance to determine an optimum aperture size to obtain the predetermined F-number for each of possible magnification rates and for storing the optimum aperture size for each of possible magnification rates in the memory.

2. The apparatus of claim 1,
wherein the control means sets the adjustable diaphragm at a stored aperture size for a designated print size.

3. The apparatus of claim 1,
wherein the control means determines an exposure amount automatically on the basis of the predetermined F-number.

4. The apparatus of claim 3,
wherein the control means determines an opening time period of shutter member for each of possible magnification rates on the basis of the predetermined F-number.

5. The apparatus of claim 1, further comprising
a frame member for forming negative mask, the frame member adapted to be adjustable so that a trimming amount for the negative film is adjusted.

* * * * *